United States Patent Office 3,123,589
Patented Mar. 3, 1964

3,123,589
POLYMERIZATION OF STYRENE SULFONIC ACID AND SALTS THEREOF
William N. Vanderkooi and Richard A. Mock, Midland, Mich., assignors to The Dow Chemical Company, Midland, Mich., a corporation of Delaware
No Drawing. Filed Sept. 9, 1960, Ser. No. 54,834
5 Claims. (Cl. 260—79.3)

The present invention relates to an improved process concerning the autogenous homo- and copolymerization of styrene sulfonic acids and the alkali metal salts thereof.

It is among the principal objects of the present invention to provide a simplified and efficient process for the autogenous homo- and copolymerization of styrene sulfonic acid and salts thereof whereby the contaminating influence of catalyst residues in the polymer product is eliminated. A still further object is to provide polymers of styrene sulfonic acid and salts thereof that have highly reproducible average molecular weights. Other objects will become apparent hereinafter as the invention is more fully described.

Accordingly, the foregoing objects are achieved in the present invention by means of a process for preparing an autogenously polymerizing composition comprising a partially oxygenated ar-sulfonated styrene selected from the group consisting of styrene sulfonic acid and the alkali metal salts thereof and polymers prepared therefrom. Hereinafter for the purposes of the present invention the terminology "ar-sulfonated styrene" shall be interpreted as being inclusive of styrene sulfonic acids and alkali metal salts thereof. By "styrene sulfonic acids" is meant all of the various position isomers that are possible as the result of the mono-substitution of sulfonic groups on the aromatic portion of styrene.

In the first phase of the process, an ar-sulfonated styrene monomer is obtained and dried, if necessary, to a residual moisture content less than about 15 percent and preferably less than about 5 percent by weight of the monomer. The ar-sulfonated styrene can be prepared by known means such as are disclosed in United States Letters Patent 2,821,549. The dry monomer is contacted with gaseous oxygen for a predetermined period of time and under suitable temperature and oxygen pressure conditions to achieve a partial oxygenation thereof.

It is essential for operability that the partially oxygenated ar-sulfonated styrene exhibit, in the absence of free oxygen, a polarogram having a wave amplitude of at least about 0.01 microampere at a half-wave potential of −0.2 volt per gram of the partially oxygenated ar-sulfonated styrene in 50 milliliters of a supporting electrolyte. "Polarogram" as employed herein refers to the electromotive force-current relationships obtained by means of polarographic analytical techniques which utilize a dropping mercury cathode, a saturated calomel anode and an aqueous 0.2 N lithium chloride solution supporting electrolyte.

The partially oxygenated ar-sulfonated styrene composition contains at least three distinct reaction products of which only one, i.e., that oxygenation product exhibiting a half-wave potential of −0.2 volt vs. the saturated calomel electrode in the absence of free oxygen, is a polymerization reaction initiator. This product constitutes from about 10 to about 25 percent of the total initial oxygenation products. Other partial oxygenation products that have been observed upon polarographic analysis exhibit polarogram waves having half-wave potentials of −1.0 and −1.3 volts.

In carrying out the partial oxygenation of a dry ar-sulfonated styrene, reaction conditions such as the oxygen pressure, temperature and time, while being related variables, are not critical. Gaseous oxygen which may be employed in a pure state or in mixtures with inert gases as in air, is contacted with an ar-sulfonated styrene for a sufficient period of time to provide the desired extent of oxygenation. For example, oxygen pressures down to 1 mm. of mercury are operable but it is desirable to employ higher pressures such as at least about 160 mm. of mercury as may be effectively supplied by the partial pressure of oxygen in air at normal atmospheric conditions. Higher oxygen pressures can be employed if desired to promote a more rapid rate of oxygenation thereby reducing the period of time required to achieve a particular desired level of partial oxygenation.

The effect of temperature on the oxygenation reaction is similar to that of oxygen pressures and is not critical within a range defined by the lower limit at which gaseous oxygen is obtained and an upper limit at which the monomer decomposes. Preferably, however, the oxygenation reaction is carried out at a convenient temperature within the range from about 20° to 70° C.

Having selected a convenient oxygen pressure and temperature for the oxygenation reaction, the period of time during which these conditions are maintained is a dependent variable determined by the desired extent of oxygenation.

A polarogram wave amplitude of at least 0.01 microampere at a half-wave potential of −0.2 volt under the above-specified polarographic conditions indicates the minimum concentration of the oxygenation-produced initiator that is required to obtain effective autogenous polymerization of the partially oxygenated ar-sulfonated styrene. It is preferred, however, that the partial oxygenation reaction be continued until test samples exhibit polarogram wave amplitudes at a half-wave potential of −0.2 volt of from about 0.1 to about 0.8 microampere.

To polymerize compositions comprising one or more of the partially oxygenated styrene sulfonates prepared in the above manner, a sufficient quantity of the partially oxygenated monomer is dissolved in water to provide from about 5 to about 35 percent and preferably about 9 to about 15 percent monomer solids. Free oxygen is removed from the aqueous solution by purging it with an inert gas such as nitrogen or boiling it under a vacuum. The solution is then maintained in an oxygen-free environment at a suitable reaction temperature until the desired conversion of monomer to polymer has been achieved. When the oxygen has been removed, the polymerization reaction begins immediately and upon achieving the desired degree of conversion, the polymerization reaction is terminated by exposing the reaction mass to oxygen. The polymeric product is separated from the aqueous polymerization reaction medium by precipitation and filtration techniques.

While higher temperatures increase the rate at which polymer chains grow, they also increase the rate of polymer chain initiation with the resulting consequence that increases in the reaction temperature cause the formation of lower molecular weight products. It has been found that polymerization reaction temperatures from about 20° to about 90° C., when employed in conjunction with the above-mentioned preferred concentrations of the oxygenation-produced initiator, are most desirable from the standpoint of achieving a substantial conversion of the monomer to a high molecular weight material within a reasonable period of time. Depending upon the concentration of the initiator and the exact reaction temperature employed, the time required to achieve substantial conversion of the monomer into a polymeric product may range from about 5 to about 4000 minutes.

It is necessary, when carrying out the polymerization reaction, to maintain a solution pH of less than about 10, preferably less than about 4. Control of this variable is ordinarily not difficult when pure monomer compositions are employed. However, should an ar-sulfonated styrene be used in which an excess of a base is present, it may be necessary to first neutralize the monomer solution with a mineral acid and subsequently recover the solid monomer prior to subjecting it to partial oxygenation.

Upon completion of the polymerization reaction, the polymeric product may be recovered by means of any conventional separatory procedure such as precipitating the product with a non-solvent, which may be, for example, such water-miscible organic liquids as lower aliphatic alcohols, esters or ketones.

Although the above-described procedure for the autogenous polymerization of the partially oxygenated ar-sulfonated styrenes is directed to a batch process technique, it is to be clearly understood, as will be apparent to one skilled in the art, that with appropriate modifications, the above-specified reaction conditions or the equivalent thereof can be achieved in a continuous process.

By way of further illustrating the present invention, partially oxygenated sodium styrene sulfonate monomer compositions were polymerized in aqueous mediums to provide homopolymers of varying molecular weights. In a particular run, a polymerization vessel was assembled consisting of a 1 liter flask equipped with a thermometer, pH measuring electrodes, magnetic stirring bar and a graduated cylinder for admitting measured volumes of water. The flask was also connected to a vacuum manifold and a nitrogen source. The polymerization vessel was maintained in a temperature controlled, paraffin oil bath which was heated electrically.

A quantity of sodium styrene sulfonate monomer that had been purified by recrystallization was exposed to air while being maintained at 30° C. for 116 hours. Under these conditions, a partially oxygenated monomer was prepared which, upon polarographic analysis, exhibited a polarogram wave amplitude at −0.2 volt half-wave potential of 1.36 microamperes per gram of the partially oxygenated sodium styrene sulfonate monomer in 50 ml. of aqueous 0.2 N lithium chloride.

In obtaining the polarographic analysis of the partially oxygenated sodium styrene sulfonate, a weighed sample of the partially oxygenated product was diluted to 50 milliliters with 0.2 N lithium chloride solution and transferred to a polarograph cell. The solution was bubbled vigorously for at least 10 minutes with oxygen-free nitrogen. A polarogram was then obtained by means of a dropping mercury cathode-saturated calomel anode between applied E.M.F. from +0.1 to −1.9 volts. The dropping mercury electrode employed had a capillary constant of 2.28. The amplitude of the conductance wave was measured in microamperes.

A quantity of the dried, partially oxygenated sodium styrene sulfonate powder was charged to the reaction vessel. The reaction vessel was evacuated and a sufficient quantity of deionized, oxygen-free water, i.e., water that had been distilled under a nitrogen atmosphere, was added to the monomer with stirring to form a solution containing 3.76 percent monomer solids. The reaction vessel was then purged with nitrogen and the temperature of the system adjusted to 40° C. Upon purging of the reaction vessel, the polymerization reaction began immediately and was continued for 1000 minutes thereby achieving 87 percent conversion of the monomer to a polymeric product. At this point, the reaction system was exposed to air which terminated the polymerization reaction.

The polymeric product was separated by adding the reaction mass to a large excess of isopropanol and filtering the precipitated polymer. The weight average molecular weight of the polymeric product thus obtained was determined by light scattering measurements and found to be 200,000.

In the foregoing manner, other partially oxygenated sodium styrene sulfonate compositions containing varying amounts of the oxygenation-produced polymerization initiator were polymerized at 40°, 50° and 80° C., respectively.

The weight average molecular weights of the polymers were determined by light scattering techniques employing known concentrations of the polymer products in 0.55 to 0.65 normal sodium chloride solutions. Refractive index differences were measured with a differential refractometer employing aqueous polymer and solvent solutions containing the same concentration of sodium chloride.

Results of the above-described runs are tabulated in Table 1.

*Table 1*

| Run Number | Polymerization Temp., degrees | μa./g. NaSS/50 ml.[3] | | | Monomer Conc. (g./100 ml.) | pH | Reaction Time (min.) | Conversion Monomer to Polymer | Mol. Wt. (Wt. Avg.) |
|---|---|---|---|---|---|---|---|---|---|
| | | −0.2 v. | −1.0 v. | −1.3 v. | | | | | |
| 1 | 80 | 0.004 | 0.05 | 0.64 | 32 | 8 | 1,080 | [1] 7.8 | 360,000 |
| 2 | 80 | 0.02 | 0.46 | 0.09 | 31.4 | 7 | 60 | [1] 22.5 | 350,000 |
| 3 | 80 | 0.02 | 0.41 | 0.34 | 33.4 | 6.8 | | [1] 22.1 | 260,000 |
| 4 | 80 | 0.04 | 1.13 | 1.5 | 29.2 | 5.2 | 180 | [1] 50.5 | 120,000 |
| 5 | 80 | 0.31 | 0.15 | 0.88 | 22.1 | | 180 | [2] 75.0 | |
| 6 | 60 | 0.01 | 0.20 | 0.55 | 8.5 | 6.0 | 1,020 | [1] 2.6 | |
| 7 | 60 | 0.02 | 0.49 | 0.82 | 16.9 | 6.7 | 240 | [1] 20.9 | 320,000 |
| 8 | 50 | 0.19 | 0.40 | 0.45 | 10.3 | | 4,000 | [2] 77 | 1,100,000 |
| 9 | 50 | 0.65 | 0.67 | 2.02 | 9.9 | | 1,200 | [2] 96 | 710,000 |
| 10 | 40 | 0.48 | 1.34 | 1.90 | 5.7 | | 1,000 | [2] 75 | |
| 11 | 40 | 1.36 | 2.17 | 3.53 | 3.8 | | 1,000 | [2] 89 | 200,000 |
| 12 | 40 | 1.76 | 2.59 | 6.41 | 3.5 | | 1,000 | [2] 84 | 120,000 |

[1] Represents constant conversion levels achieved within the specified reaction time, i.e., additional reaction time would give no greater conversion.
[2] Reactions terminated after substantial conversion at the specified times. Additional conversion would be achieved if reaction were continued beyond specified times.
[3] Microamperes per gram of partially oxygenated sodium styrene sulfonate in 50 milliliters of 0.2 N lithium chloride at the specified half wave potentials.

A comparison of the above polymerization runs indicates that only the oxygenation product exhibiting a half-wave at −0.2 volt is active as a polymerization initiator. This is shown by the correlation of polymerization results with its concentration as indicated by polarogram wave amplitudes and the lack of any correlation of the polymerization results with polarogram wave amplitudes obtained at half-wave potentials of −1.0 and 1.3 volts which correspond to other oxygenation products of sodium styrene sulfonate.

In a manner similar to that of the foregoing, other homo- and copolymers of ar-sulfonated styrenes can be prepared by substituting one or more materials of the group consisting of potassium styrene sulfonate, lithium styrene sulfonate, styrene sulfonic acid and the like compounds, including all position isomers thereof, for the sodium styrene sulfonate employed in the foregoing procedure.

What is claimed is:

1. A polymerization process which consists essentially of the steps of contacting a dry, ar-sulfonated styrene monomer selected from the group of styrene sulfonic acids and the alkali metal salts thereof with gaseous oxygen for a period of time sufficient to provide a partially oxygenated composition of which an average sample, in the absence of free oxygen, exhibits a polarogram having a wave amplitude of at least 0.01 microampere at a half-wave potential of —0.2 volt per gram of the partially oxygenated ar-sulfonated styrene in 50 milliliters of supporting electrolyte, dissolving a sufficient quantity of the partially oxygenated ar-sulfonated styrene in water to produce a solution containing from about 5 to about 35 percent by weight of said sulfonated styrene, removing free oxygen from the aqueous solution thus prepared and maintaining the aqueous solution at a pH less than about 10 in an oxygen-free environment for a period of time sufficient to achieve a desired conversion of the ar-sulfonated styrene monomer into a polymeric material.

2. A polymerization process as in claim 1 wherein the ar-sulfonated styrene monomer is sodium styrene sulfonate.

3. A polymerization process which consists essentially of the steps of contacting a dry, ar-sulfonated styrene monomer selected from the group of styrene sulfonic acids and the alkali metal salts thereof with gaseous oxygen for a peirod of time sufficient to provide a partially oxygenated composition of which an average sample, in the absence of free oxygen, exhibits a polarogram having a wave amplitude of at least 0.01 microampere at a half-wave potential of —0.2 volt per gram of the partially oxygenated ar-sulfonated styrene in 50 milliliters of supporting electrolyte, dissolving a sufficient quantity of the partially oxygenated ar-sulfonated styrene in water to produce a solution containing from about 5 to about 35 percent by weight of said sulfonated styrene, removing free oxygen from the aqueous solution thus prepared, maintaining the aqueous solution at a pH less than about 10 in an oxygen-free environment for a period of time sufficient to achieve a desired conversion of the ar-sulfonated styrene monomer into a polymeric material and separating this polymeric product from the aqueous reaction medium.

4. A polymerization process which comprises the steps of dissolving in water in the absence of an added polymerization catalyst, an ar-sulfonated styrene monomer selected from the group styrene sulfonic acids and the alklai metal salts thereof, an average sample of which dissolved monomer is characterized by a polarogram in the absence of free oxygen indicating a wave amplitude of at least 0.01 microampere at a half-wave potential of minus 0.2 volt per gram of the monomer in 50 milliliters of supporting electrolyte, the resulting solution containing from about 5 to about 35 percent by weight of the monomer solute, removing free oxygen from the aqueous solution thus prepared and maintaining the aqueous solution at a pH less than about 10 in an oxygen-free environment for a period of time sufficient to achieve a desired conversion of the ar-sulfonated styrene monomer into a polymeric material.

5. A polymerization process which consists essentially of the steps of dissolving in water an ar-sulfonated styrene monomer selected from the group styrene sulfonic acids and the alkali metal salts thereof, an average sample of which dissolved monomer is characterized by a polarogram in the absence of free-oxygen indicating a wave amplitude of at least 0.01 microampere at a half-wave potential of minus 0.2 volt per gram of the monomer in 50 milliliters of supporting electrolyte, the resulting solution containing from about 5 to about 35 percent by weight of the monomer solute, removing free oxygen from the aqueous solution thus prepared and maintaining the aqueous solution at a pH less than about 10 in an oxygen-free environment for a period of time sufficient to achieve a desired conversion of the ar-sulfonated styrene monomer into a polymeric material.

References Cited in the file of this patent
UNITED STATES PATENTS
2,837,500   Andres et al. _____ June 3, 1958